Dec. 19, 1939.  E. A. ROBBINS  2,183,922
MILLING CUTTER
Filed Aug. 16, 1937
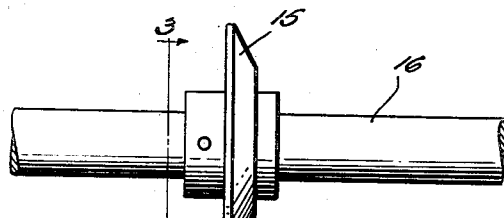
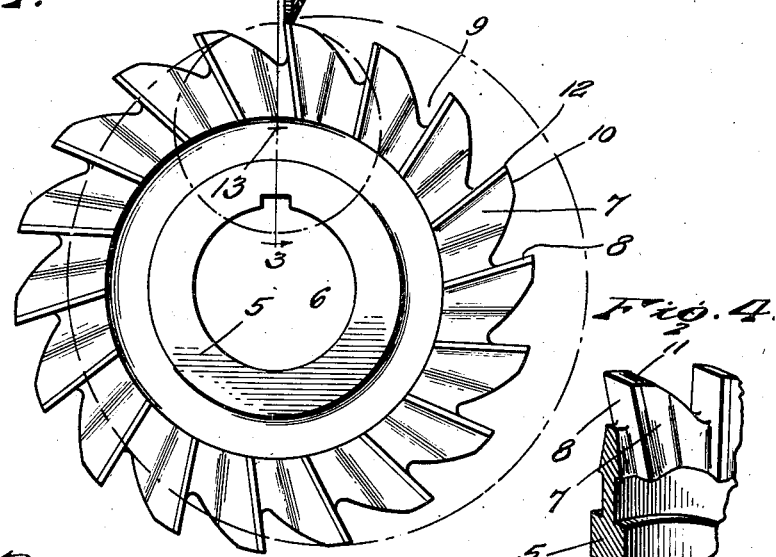
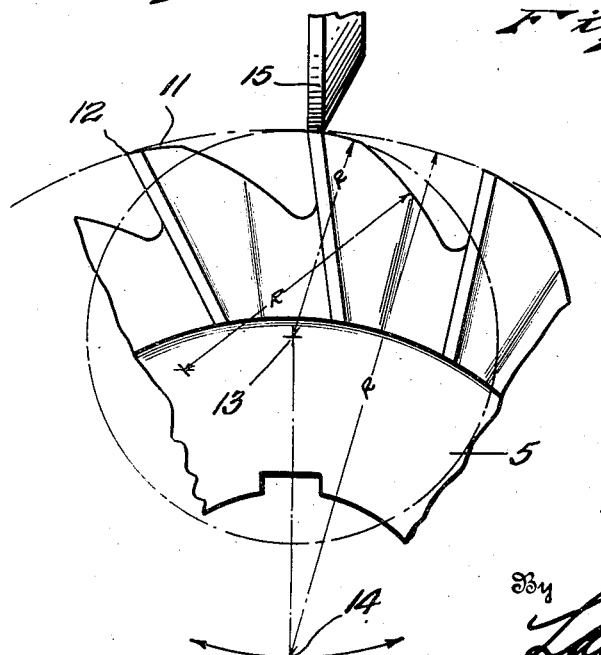
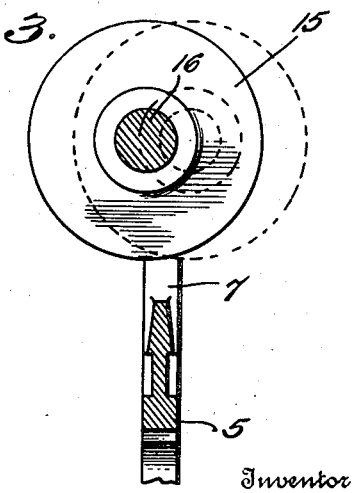
Inventor
Elwin A. Robbins
By Lacey & Lacey, Attorneys Patented Dec. 19, 1939

2,183,922

UNITED STATES PATENT OFFICE 2,183,922

MILLING CUTTER

Elwin A. Robbins, Nashua, N. H.

Application August 16, 1937, Serial No. 159,417

1 Claim. (Cl. 29—103)

This invention relates to metal cutting tools and more particularly to a milling cutter and method of sharpening the same.

After a milling cutter has been cut and properly tempered, it is necessary to sharpen the cutting edges of the teeth of the cutter before installing the tool in a milling machine. This sharpening of the cutting teeth is usually effected by means of a rotary grinding element which causes the formation of concave lands on the cutting teeth and thereby tends to weaken the cutting edges and cause chipping or fracture thereof. Moreover, as the length of the concave portions in the lands increases as the teeth are repeatedly sharpened, it follows that the danger of breakage or mutilation of the cutting edges of the teeth is always present and whenever the efficiency of the tool is thus impaired necessitates the removal and replacement of the damaged cutter with a consequent loss of time and expense incident to replacing or resharpening the cutter.

The object of the invention, therefore, is to obviate these objectionable features and to provide a rotary milling cutter of simple and inexpensive construction which will effectually and expeditiously cut keyways or seats in all kinds of shafting and other work and in which liability of accidental chipping or breakage of the cutting teeth and chattering thereof is reduced to a minimum, thereby materially increasing the effective life of the cutter.

A further object of the invention is to provide a milling cutter, the land of each cutting tooth of which is convex and disposed on the arc of a circle having its axis eccentric to the axis of rotation of said cutter, thereby to reinforce the cutting edges of the teeth while at the same time providing sufficient clearance for the elimination of chips and shavings during the cutting operation.

A further object of the invention is to provide a novel method of sharpening the teeth of a milling cutter which consists in positioning a rotary grinding element at the periphery of the milling cutter, rotating the cutter about its center of normal rotation to successively bring the teeth thereof into position for contact with the grinding element and during the grinding operation swinging the cutter on an axis eccentric to the axis of normal rotation of the cutter to form a convex land at the rear of each cutting tooth disposed on the arc of a circle, the axis of which is eccentric to the axis of rotation of said cutter.

A still further object of the invention is generally to improve this class of tools so as to increase their utility, durability and efficiency.

In the accompanying drawing forming a part of this specification and in which similar numerals of reference indicate corresponding parts in all the figures of the drawing:

Figure 1 is a side elevation of a milling cutter embodying the present invention, showing the method of sharpening the cutting teeth thereof, Figure 2 is an enlarged detail side elevation of a portion of the cutter showing the position of the axis on which the cutter is swung during the grinding operation to form the convex lands and also the true axis of rotation of said cutter as well as the radius of the clearance notches or recesses, Figure 3 is a vertical sectional view taken on the line 3—3 of Figure 1, and Figure 4 is a detail perspective view of a portion of the sharpened cutter.

The improved milling cutter forming the subject matter of the present invention comprises a circular body portion 5 provided with a central bore 6 to permit mounting of the cutter on a suitable arbor or spindle. Formed in the periphery of the body portion 5 are a plurality of teeth 7 each provided with a cutting face 8 and at the rear of the cutting face with a notch or recess 9 to permit the ready discharge of chips or shavings during the cutting operation. Each tooth 7 is provided with a land 10, the surface of which is convex, as indicated at 11, and merges into the adjacent cutting edge 12 so as to reinforce and strengthen said cutting edge and thereby prevent chipping or mutilation thereof when the cutter is in operation.

In the manufacture of milling cutters after the cutter has been cut and properly tempered, it is necessary to sharpen the cutting edges of the teeth before installing the cutter in a milling machine, and in sharpening said teeth I grind the lands 10 thereof so as to form the convex portions 11 in the following manner: After the milling cutter has been tempered, I mount said cutter in a suitable machine so as to permit swinging movement thereof on a center or axis 13 eccentric to the center 14 of normal rotation of said cutter, as indicated in Figure 2 of the drawing. A rotary grinding element 15 is mounted on a shaft 16 in juxtaposition to the peripheral edge of the cutter, as shown, and this rotary grinding disk or element is preferably disposed at right angles to the plane of the milling cutter and is adapted to reciprocate over the lands of the teeth to effect the sharpening operation, as indicated by dotted lines in Figure 3. The teeth 7 are then rotated with a step by step movement so as to bring said teeth successively in contact with the grinding element 15 and as said grinding element reciprocates and the milling cutter 5 is swung about the axis 13, the lands of the cutting teeth will be ground with the convex surfaces 11, which convex surfaces 11 are disposed on the arc of a circle having its axis 13 eccentric to the axis 14 of normal rotation of said cutter. The convex surfaces 11 of the lands merge into and intersect the cutting edges 12 of the teeth so as to reinforce said teeth and prevent chipping or mutilation thereof and these convex portions 11 of the lands will be formed on the teeth irrespective of the number of times the teeth are sharpened so that the necessity for removal and replacement of damaged cutters with a consequent loss of time and expense incident thereto is reduced to a minimum.

The convex lands may be formed on any style of milling cutter and the improved method of sharpening is also adaptable to any type of standard milling cutter. When the teeth of a milling cutter are sharpened by concaving the lands thereof in the usual manner, said cutting edges are not only weakened but have a tendency to chip as previously stated, and by forming the lands with convex surfaces this chipping or damage to the cutting edges of the teeth is entirely obviated, thereby materially increasing the effective life of the cutter.

From the foregoing description, it is thought that the construction and operation of the cutter will be readily understood by those skilled in the art and further description thereof is deemed unnecessary.

Having thus described the invention, what is claimed as new is:

A rotary milling cutter having cutting teeth provided with front faces and lands, the land of each tooth having upper and lower portions disposed on the arcs of circles having their axes shorter than and eccentric to the axis of normal rotation of said cutter, the said upper and lower portions intersecting at an angle intermediate the length of the land, the center for the upper portion being spaced rearwardly from the center for the lower portion and the said upper portion being a convexed portion intersecting the cutting edge at the upper end of the front face of the tooth and serving to reinforce said cutting edge and prevent chipping thereof, said convex portion being downwardly inclined rearwardly of the cutting edge to provide clearance.

ELWIN A. ROBBINS.